Johnson & Freeman,
Cracker Machine,
Nº 3,585. Patented May 17, 1844.
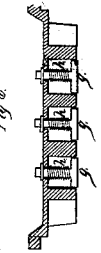
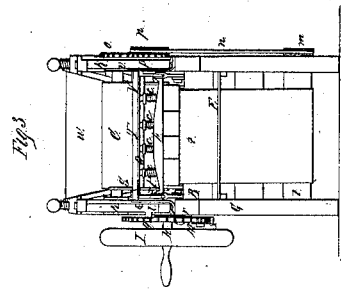
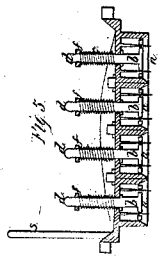
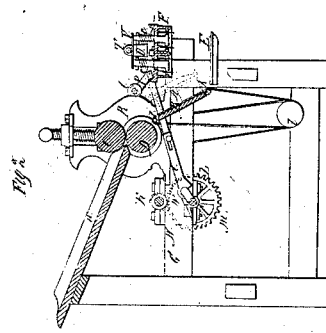
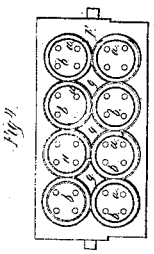
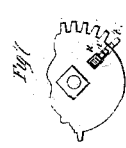
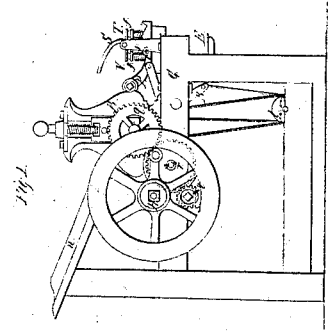

UNITED STATES PATENT OFFICE.

JNO. JOHNSON AND O. FREEMAN, OF BOSTON, MASSACHUSETTS, ASSIGNORS TO WM. H. TUTTLE.

CRACKER-MACHINE.

Specification of Letters Patent No. 3,585, dated May 17, 1844.

*To all whom it may concern:*

Be it known that we, JOHN JOHNSON and OTIS FREEMAN, of Boston, in the county of Suffolk and State of Massachusetts, have invented a certain new and useful Improvement in Machinery for Cutting Crackers, Ship-Biscuit, &c., from Dough, and that the following description and accompanying drawings, taken in connection constitute a full and exact specification thereof.

Figure 1 of the drawings above mentioned represents a side elevation of our improved machinery. Fig. 2 is a central and longitudinal section thereof. Fig. 3 is an elevation of the front end. Fig. 4 is a bottom view of the cutters. Fig. 5 represents a vertical section of the cutter frame taken through the main cutters and discharging pistons. Fig. 6 is a central and vertical section of the said cutter frame, exhibiting the scrap pistons, and Fig. 7 denotes a section of the pinion which is upon the crank shaft and in the vicinity of the fly wheel, in order to exhibit the arrangement of its spring tooth.

The peculiar object of our improvement is to separate the crackers or biscuits from the waste dough and scraps as fast as the said crackers are stamped, and to cause them to be deposited upon a shelf or other suitable receptacle, convenient for their removal by the baker, and the waste dough and scraps to be removed as fast as necessary.

In order to produce the above effects a part of the endless apron (A, Figs. 1, 2, 3) and bed (B) over the surface of which the apron travels, and rests, are arranged in the inclined position with respect to the reducing roller, C, D, and a horizontal shelf or table E, as seen in Fig. 3. The cutter frame F, containing a series of cutters having forcing and scrap pistons arranged and operating in the usual manner, is placed in front of the bed B and directly over or above the shelf or table E, and as the dough after its passage between the reducing rollers, or cylinders, descends upon the apron A and covers that part of the same which lies over or upon the bed, B, the revolution or movement of the endless apron should be stopped for a sufficient time to allow the stamping or cutting frame to be turned down into an inclined position and to be forced against or drawn down upon the sheet of dough upon the apron. The cutter frame, having performed its operation upon the dough, returns to its horizontal position, carrying with it the crackers, and leaving the waste dough and scraps upon the apron. As the cutter frame rises into the horizontal position its main or cracker pistons are to be forced outward or against the crackers so as to cause them to drop downward upon the shelf or table or receptacle below them. On the departure of the cutter frame from the bed or endless apron, the scrap pistons should operate upon the scraps so as to force them out from between the cutter, and cause them to remain upon the endless apron and be carried downward as soon as the movement of the apron again takes place.

The operative parts of the mechanism are mounted upon a frame G, suitably arranged to sustain them, and they are put in motion by manual or other proper power applied so as to revolve the driving shaft H. A fly wheel is arranged upon one end of the driving shaft, and a small toothed pinion K at the other end thereof. The said pinion engages with and turns a cogged wheel L fixed upon the crank shaft M. The said crank shaft has a bell crank N, placed on each side of the center of it and just within the framework; and to each crank a connecting rod O is jointed and extends therefrom to a point intermediate of the ends of one of two arms P, P, the said rod being jointed at such point to the arm. Each of the said arms is curved as seen in the drawings and turns or moves at its upper end upon a horizontal rod Q extending from one of the standards R which support the boxes of the journals of the reducing cylinders C, D, to the other. The lower end of each arm is jointed to the central part of one of the ends of the cutter frame. A curved bar S rises upward from the top of the cutter frame near one end thereof and rests and moves against a horizontal rod or bar T extending over the cutter frame and supported in position by two standards U, U, erected upon the main framework. To the underside of the said rod or bar T a plate of metal, V is secured in a horizontal position, the object of the said plate being to force the pistons of the cracker cutters outward, when the cutter frame rises toward a horizontal position, and thereby press the crackers or biscuit therein out thereof, so as to permit them to fall upon the shelf E. Whenever the cutter frame is drawn downward or toward the endless apron on the bed B, the curved bar S, by always being drawn into contact with the horizontal bar T, causes the cutter frame to change its horizontal position to an inclined one, or to such an inclination as shall cause the plane of the cutting edges of the cutters to coincide with the inclined plane surface of the apron upon the bed B.

The main cutters $a, a, a, a$, (see Figs. 4, 5) have a series of pistons $b, b, b, b$, which are elevated or kept within the cutters (or so that the lower face of each piston shall be within its cutter or at a distance from its cutting edge, equal to the thickness of the cracker) by means of helical springs $c, c$, passed over the rods $d, d$ of the crackers and resting upon the top of the cutter frame, and acting against nuts $f, f$, &c., screwed upon the tops of the rods of the pistons. The pistons $g, g, g$ are arranged between the main cutters and have springs $h, h$, adapted to their rods, which tend always to force the pistons a short distance beyond the plane of the cutting edges of the cutters, in order that whenever the cutter frame is drawn down upon the sheet of dough, which lays upon the endless apron, the scrap pistons may recede sufficiently to permit the cutters to enter through the dough and as soon as the cutters depart from the apron to advance and expel the scraps from between the cutters, and thereby cause them to remain upon the apron while the biscuits or crackers are drawn away from the same by the cutter frame. The endless apron is sustained in position by three horizontal rollers $i, k, l$, over which it passes as seen in Fig. 2. The lower of the said rollers, viz $l$ has a grooved pulley $m$ fixed upon one end of its shaft, around which (pulley) an endless belt $n$ passes to and around another grooved pulley fixed upon the extremity of the axis or shaft of the lower reducing cylinder. The two reducing cylinders C, D are geared together by two spur gears $o, p$. The lower cylinder has another geared or toothed wheel $q$, on its shaft which engages with a toothed wheel $r$, to which motion is given by a toothed pinion $s$ fixed upon one end of the crank shaft M. During the time the impression is being given by the cutter frame upon the dough, the motion of the endless apron over the surface of the bed B, must be arrested, and as soon as the impression has been completed and the cutter frame has departed from the apron, the said apron should be put in motion and moved upon the bed a distance equal, or about equal, to the width of the cutter frame, in order to introduce a sheet of dough to the cutter frame at its succeeding depression. This is effected by the pinion $s$, which has the teeth upon about one third of its circumference removed as seen in the side elevation. Of course, when such portion of the circumference thereof revolves in contact, or nearly so, with the wheel $r$, no motion of the said wheel will take place. Therefore the motion of the endless apron will be arrested until the teeth of the pinion $s$ again come in contact with those of the wheel $r$ and give motion to the said wheel. In order to insure the correct action of the teeth of the pinion upon those of the wheel, or to avoid any accident which might occur by reason of the end of the first tooth of the series, or arc, of teeth of the pinion, coming in contact with the end of one of the teeth of the wheel $r$, instead of the side of the tooth of the pinion striking against the side of one of the teeth of the wheel, as it ought to, the said first tooth $t$, of the pinion is made moveable in the direction of its depth; that is to say it is so affixed in the wheel as to be pressed outward somewhat beyond the others, by a spring which permits it to recede when in contact with the wheel and while acting thereon. The extension of the tooth beyond the others causes it always to enter the space between two adjacent teeth of the wheel, and therefore obviates any danger of accident, or fracture of the teeth, as above set forth.

Fig. 7 exhibits the arrangement of the spring $u$ anl tooth $t$. The tooth is attached to a shank $v$, which plays or moves in a corresponding hole or aperture bored into the wheel from its circumference toward its center. The spring is inserted in the bottom of the aperture, as seen in the drawing and acts against the shank $v$, so as to force the tooth outward. Any convenient method may be adopted to prevent the tooth from dropping out of the pinion during the revolution of the latter.

The dough to be converted into crackers is placed upon an inclined plane $w$ (arranged in rear of the reducing rollers C, D as seen in the drawings) and descends the same and passes between the rollers and is, by them, reduced to the requisite thickness and stamped in the manner as before described. The cutter frame should be heavier on the side nearest the endless apron when it is in a horizontal position, in order to bring it into a horizontal position as it rises from the apron.

Having thus described our invention we shall claim—

1. Causing the cutter frame with the cutters after the impression has been given upon the dough, to move away from the inclined bed, or apron over the bed, and leave the scraps and waste dough upon the apron or bed, and to drop the crackers or biscuits upon a shelf or other suitable receptacle separate from the apron or bed, all in the manner as above set forth, the said shelf cutters and apron being constructed and operating substantially as above set forth.

2. Also the mechanism by which the cutter frame is operated and turned from a horizontal position to an inclined one—the same consisting of the curved bar S and horizontal bar T in combination with the mechanism which draws the cutter frame toward the inclined apron or bed; the whole being constructed and arranged as above set forth.

In testimony that the above is a correct specification we have hereto set our signatures this tenth day of January, A. D. 1844.

JOHN JOHNSON.
OTIS FREEMAN.

Witnesses:
R. H. EDDY,
JOHN NOBLE.